Figure 1:
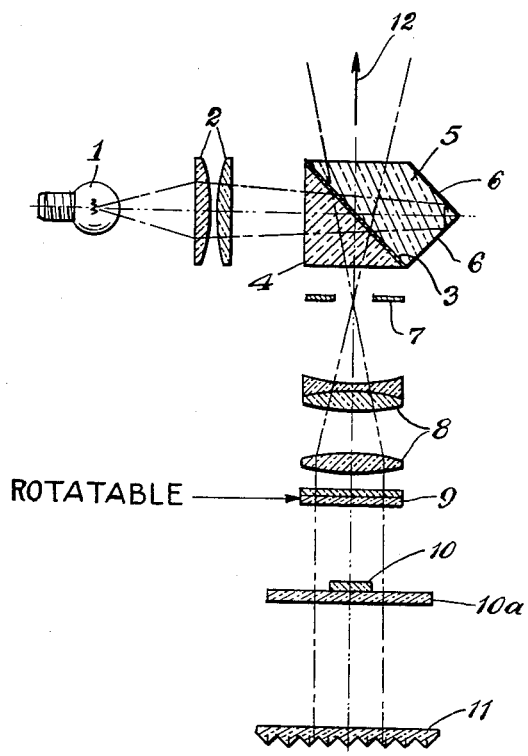

July 12, 1960     K. RÄNTSCH     2,944,463
ILLUMINATING DEVICE PARTICULARLY FOR OBJECTS IN MICROSCOPES
Filed Jan. 13, 1956     2 Sheets-Sheet 1

Inventor
Kurt Räntsch
by Singer Stern & Carlberg
Attorneys

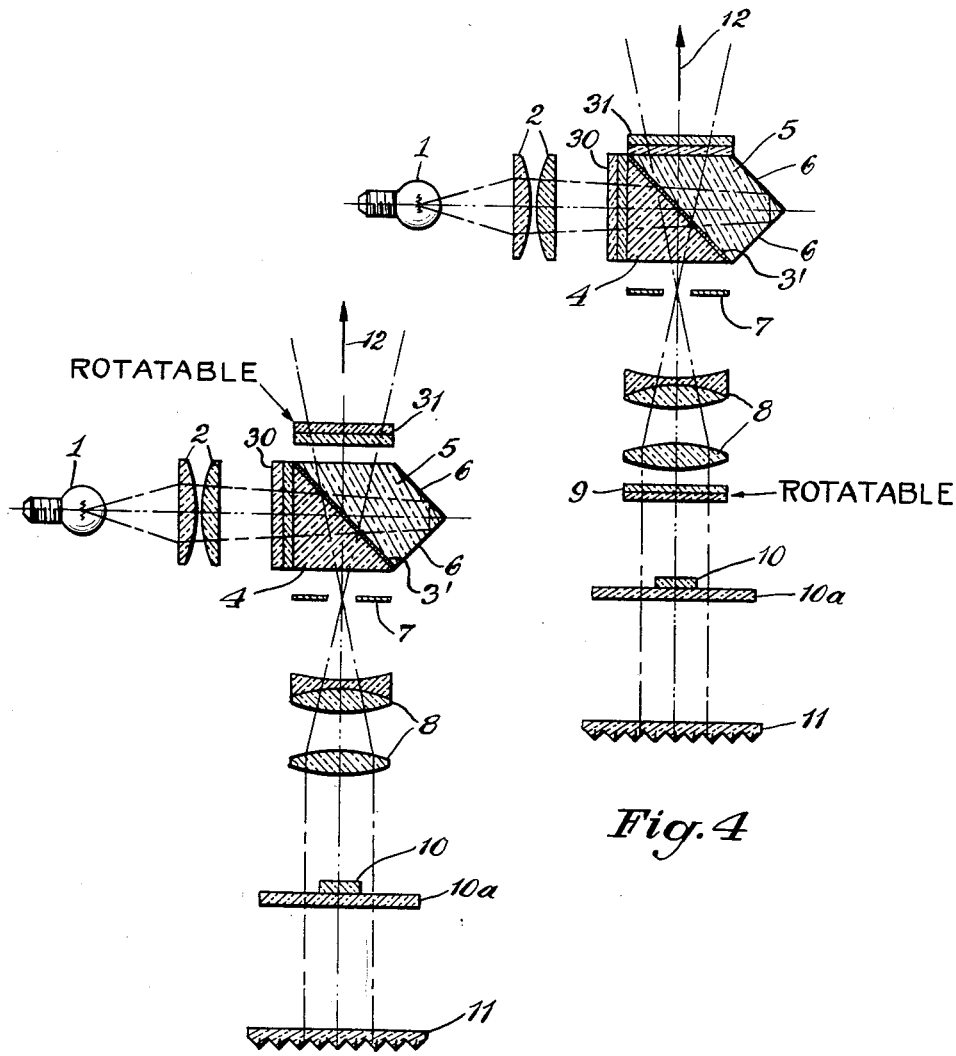

United States Patent Office 2,944,463
Patented July 12, 1960

2,944,463
ILLUMINATING DEVICE PARTICULARLY FOR OBJECTS IN MICROSCOPES

Kurt Räntsch, Wetzlar, Germany, assignor to Carl Zeiss, Oberkochen, Wurttemburg, Germany Filed Jan. 13, 1956, Ser. No. 558,997

Claims priority, application Germany Jan. 14, 1955

10 Claims. (Cl. 88—39)

The present invention relates generally to illuminating systems employed in optical instruments and more particularly is directed to an illuminating system for illuminating an object viewed in a microscope, wherein polarizing and analyzing means are arranged in the path of the illuminating light rays and wherein, if desired, also a rotatable quarter wave length lamella is used for rotating the plane of vibration of the light to the desired degree while arranging in rear of the object a reflecting and depolarizing surface.

It is an object of the invention to provide an improved polarized light type of illuminating system for use in microscopes.

More specifically it is an object of this invention to provide an improved illuminating system employing polarized light in microscopes, which illuminating system employs rotatable polarizing means for the light rays illuminating the object being viewed, and having depolarizing means disposed in rear of said object.

These objects are merely illustrative. Other objects and advantages will become apparent from the following considerations relating to the general organization of the invention.

Assuming that the polarizer and analyzer are formed of a layer which polarize the light, whereby light vibrating in one direction will be reflected and the light vibrating in the other direction will pass therethrough and assuming further that a quarter wave-length lamella is disposed in the path of the light ray in such a position that the polarized light will pass therethrough, that is, without influencing the direction of vibration, then the light reflected from the object will retain its direction of vibration when it again strikes the polarizing layer and therefore will not pass through the polarizing surface but will be reflected. The light which passes around the object strikes a depolarizing reflecting surface behind the object and is depolarized. If that part of the depolarized light passing through the polarizing layer in striking again the polarizing layer is introduced into a microscope then an observation of the object takes place with light which customarily is designated with through shining light.

If the quarter wave length lamella is turned about its axis in such a manner that it turns the plane of vibration of the light be 90°, first all the light reflected from the object will pass through the polarizing layer. Additionally a part of the light which passes around the object and is depolarized on the reflecting surface will also pass through the polarizing layer namely that part which vibrates in the same direction as the light reflected from the object. But the light reflected from the reflecting surface will appear faint compared with the light which is reflected from the object because the part of the light rays which has not passed through the polarizing layer and which is a part of the light rays resulting from depolarization will be missing. Thus with this arrangement the object is viewed in direct light and in faint through shining light.

When it is desired to view the object in pure direct light the reflecting surface is removed. Depending upon the angular position of the quarter wave length lamella, the object can be observed in more or less strong direct light.

If the polarizing layer is impermeable, that is it reflects only a portion of light vibrating in a predetermined direction and extinguishes the light component vibrating in a plane at right angles to the first then there are established the reversed illuminating conditions in the light which is again reflected from the polarizing layer and coming from the object and the reflecting surface, relative to the above described positions of the quarter wave length lamella. With the quarter wave length lamella described above the object was viewed in direct light with faint through shining light while in the second position of the quarter wave length lamella the object will be viewed in direct light.

It is advantageous to arrange the polarizing layer on a transparent glass plate or to cement the polarizing layer between the surfaces of a pair of prisms, in each case so that the polarizing layer is inclined at an angle to the axis of the light pencil. When the polarizing layer is cemented between prism surfaces the light passing through the polarizing layer is reflected from a prism surface back into the light ray path, spoiling the image reflection. To overcome this condition the reflecting prism surface is blackened. An even better result is obtained by designing the reflecting surface as a roof surface, because then the light is reflected twice between inclined surfaces which increases the light absorption by a factor of two.

In the event the polarizer and the analyzer are not formed by a light polarizing division layer, but the analyzer is rotatably disposed in the path of the light which is emitted from the illuminating system, the quarter wave length lamella can be eliminated, since the function of the lamella is then produced by rotating the analyzer. When the analyzer is turned into such a position that it passes polarized light coming from the light source which light is reflected from the object, then the object can be observed in direct light with faint through shining light. If the analyzer, however, is turned to block the light reflected from the object, but will pass only a portion of depolarized light reflected from the reflecting surface, the object will be seen only in through shining light.

The reflecting surface is preferably made of a plate provided with a plurality of reflecting surfaces on its back face as triple reflectors because such a mirror reflects the light substantially in the direction of the incoming light.

Figure 2:
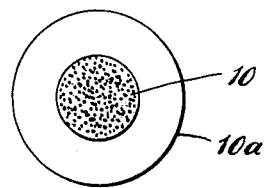
Figure 3:
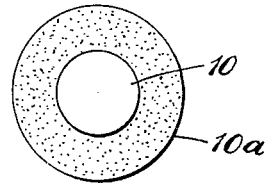

The invention will be better understood from the specific application of the foregoing principles to certain structural arrangements, embodying the principles of the present invention as presented in the accompanying drawings wherein:

Fig. 1 is a cross-sectional view of an illuminating system embodying the polarizing features of the present invention, Figs. 2 and 3 illustrate the viewing area of a microscope for different rotative positions of the quarter wave length polarizing lamella, Fig. 4 shows a modification of the illuminating system illustrated in Fig. 1, and Fig. 5 is an illuminating system as shown in Fig. 4 with a rotary analyzer.

As shown in Fig. 1 the light source may be a conventional incandescent lamp 1 or other suitable light source. The light rays emanating from the source 1 after passing through an optical condenser 2 reach a polarizing layer 3 cemented between glass prisms 4 and 5. Prism 5 is provided with roof shaped or inclined prism surfaces 6 which are blackened. The light reflected by the polarizing layer passes through an aperture in a diaphragm 7, a microscope objective 8 and a quarter wave length lamella 9, which latter is rotatably mounted about the optical axis by any suitable means (not shown). Thereafter the light impinges the object 10 supported on a transparent support 10a. Below the transparent support 10a and the object 10 thereon is arranged a tiltable or removable plate reflector 11 composed of a plurality of triple mirrors. Light reflected by the reflector 11 or coming from the object 10 and which has passed through the quarter wave length lamella 9 passes through the prism assembly 4 and 5 in the direction of the arrow 12 to a conventional microscope ocular (not shown).

In operation, the polarizing layer 3 passes one vibrational component of the light from the source 1 and reflects the vibrating component at right angles to the first. The quarter wave length lamella 9 is rotatably adjusted in such a manner that it will pass the light without influencing its vibrational direction. The light from the light source which is passed by the polarizing layer 3 impinges on the blackened inclined prism surface 6 and is effectively absorbed and extinguished. The light vibrating with a component at right angle to the component which is passed by the polarizing layer 3 is reflected through the objective lenses 8 and the quarter wave length lamella 9 to the object 10 and the reflector mirror 11 at which place it is depolarized into natural light. The light reflected from the surface of the object which vibrates in the same direction or sense it had when reflected at the polarizing layer 3, is again reflected by the polarizing layer 3 back toward the light source. Likewise the component of the depolarized light from the reflector 11, having this same vibrational sense is reflected by layer 3 back to the light source 1. However, the other vibrating component of depolarized light from reflector 11 and which also passes through the quarter wave length lamella, in its present angular setting also passes through the polarizing layer 3 in the direction of the arrow 12. In this case the object appears in the field of observation of the microscope as a dark area which is surrounded by a light area.

If the quarter wave length lamella 9 is rotatably adjusted about its axis sufficiently to shift the light passing therethrough twice by 90°, the condition described above will be reversed. The light now reflected from the object is shifted sufficiently as to its plane of vibration to pass through the polarizing layer 3 in the direction of the arrow 12.

However, the depolarized light reflected by reflector 11 is only partly shifted by the quarter wave length lamella 9 into light having a vibration component which will be passed by the polarizing layer 3. Therefore, the object 10 will appear light surrounded by a dark area as shown in Fig. 3.

If the reflector 11 is moved out of the path of the light rays, the object 10 will then be viewed in direct light.

In the embodiment of the invention illustrated in Fig. 4 the polarizing layer 3 shown in Fig. 1 is replaced by an ordinary semi-transparent mirror layer 3'. A polarizer 30 is disposed between the optical condenser 2 and the prism 4, and an analyzer 31 is disposed in the path of the light rays emerging from the top of prism 5. The principles embodied here correspond to those of Fig. 1, since the type of illumination depends from the angular position of the quarter wave length lamella 9.

In Fig. 5 the analyzer 31 of Fig. 4 is rotatably arranged and assumes the function of the lamella 9 and, hence, eliminates the need for the lamella 9. The type of illumination is now determined by the position of the analyzer 31 relative to the polarizer 30. When the polarizer 30 and the analyzer 31 are crossed, only a portion of the light will pass through the analyzer 31, namely a portion of the depolarized light coming from the reflector 11. The object 10 has then the appearance as shown in Fig. 2. When the analyzer is arranged parallel to the polarizer 30 it will then let all the light reflected from the object 10 pass therethrough, but because of the depolarizing action of the reflector 11, as previously described, only a portion of the light reflected from the reflector 11 will pass through the analyzer. The object 10 will now be observed as shown in Fig. 3 in direct light with faint through shining light.

While several embodiments of this invention have been illustrated herein, it will be appreciated by those skilled in the art that this invention is susceptible of further modifications both in its details and in organizing of such details, without departing from the spirit and scope thereof. Accordingly, it is intended that the foregoing disclosure and the showings made in the drawings shall be considered only as illustrative of the principles of the invention and not construed in a limiting sense.

The invention is claimed as follows:

1. In an illuminating system particularly for an object to be viewed by a microscope, a light source, transparent means for supporting said object, polarizing means arranged in the path of light emanating from said light source for directing polarized light to said object, a reflector composed of a plate provided on its back face with a plurality of triple mirrors arranged with their apices in a single plane which extends at right angles to the optical axis of the microscope, said reflector being disposed behind said object to reflect said polarized light passing through said transparent supporting means and to depolarize said light, an analyzer disposed to receive light reflected from said object and said reflector, said reflected light having substantially the same path as the incoming polarized light, and a rotatable optical member disposed in said path to control the oscillation plane of the light along said path.

2. In an illuminating system particularly for an object to be viewed by a microscope, a light source, transparent supporting means for said object, a polarizing layer arranged in the path of the light emanating from said source and angularly disposed to reflect light from the source along a path arranged at an angle to the path of light coming from said source to illuminate said object with polarized light, a reflector composed of a plate provided on its back face with a plurality of triple mirrors arranged with their apices in a single plane which extends at right angles to the optical axis of the microscope, said reflector being disposed behind said object to reflect light passing through said supporting means and to depolarize said reflected light, the light reflected from said object and said reflector having substantially the same path as its incoming polarized light, and being reflected back to said polarizer which functions as an analyzer for reflecting a portion of light having one vibrational direction and for passing another portion of light therethrough having a vibration component substantially at right angles to said one direction.

3. In an illuminating system particularly for an object to be viewed by a microscope, a light source, a transparent supporting means for said object, a polarizing layer arranged in the path of the light emanating from said source and angularly disposed to reflect light from the source light path along a path of polarized light arranged at an angle to said source light path to illuminate said object on said supporting means, a glass plate on which said polarizing layer is arranged, a reflector composed of a plate provided on its back face with a plurality of triple mirrors arranged with their apices in a single plane which extends at right angles to the optical axis of the microscope, said reflector being disposed behind said object to reflect light passing through said supporting means and to depolarize said reflected light, the light reflected from said object and said reflector having substantially the same path as its incoming polarized light, and being reflected back to said polarizer which functions as an analyzer for reflecting a portion of light having one vibrational direction and for passing another portion of light therethrough having a vibration component substantially at right angles to said one direction, and rotatable optical means arranged between said polarizing layer and said object for varying the plane of vibration of the light passing therethrough.

4. In an illuminating system particularly for an object to be viewed by a microscope, a light source, transparent supporting means for said object, a polarizing layer arranged in the path of the light emanating from said source and angularly disposed to reflect light from the source light path along a path of polarized light arranged at an angle to said source light path to illuminate said object on said supporting means, a pair of prisms having said polarizing layer mounted therebetween, a reflector composed of a plate provided on its back face with a plurality of triple mirrors arranged with their apices in a single plane which extends at right angles to the optical axis of the microscope, said reflector being disposed behind said object to reflect light passing through said supporting means and to depolarize said reflected light, the light reflected from said object and said reflector having substantially the same path as its incoming polarized light, and being reflected back to said polarizer which functions as an analyzer for reflecting a portion of light having one vibrational direction and for passing another portion of light therethrough having a vibration component substantially at right angles to said one direction, and rotatable optical means arranged between said polarizing layer and said object for varying the plane of vibration of the light passing therethrough.

5. In an illuminating system particularly for an object to be viewed by a microscope, a light source, a transparent supporting means for said object, a polarizing layer arranged in the path of the light emanating from said source and angularly disposed to reflect light from the source light path along a path of polarized light at an angle to said source light path to illuminate said object on said supporting means, a pair of prisms having said polarized layer mounted at said angle therebetween, one of said prisms having a blackened surface in the path of light from said source and on the side of said layer remote from said source, a reflector composed of a plate provided on its back face with a plurality of triple mirrors arranged with their apices in a single plane which extends at right angles to the optical axis of the microscope, said reflector being disposed behind said object to reflect light passing through said supporting means and to depolarize said reflected light, the light reflected from said object and said reflector having substantially the same path as its incoming polarized light, and being reflected back to said polarizer which functions as an analyzer for reflecting a portion of light having one vibrational direction and for passing another portion of light therethrough having a vibration component substantially at right angles to said one direction, and rotatable optical means arranged between said polarizing layer and said object for varying the plane of vibration of the light passing therethrough.

6. In an illuminating system particularly for an object to be viewed by a microscope, a light source, a transparent supporting means for said object, a polarizing layer arranged in the path of the light emanating from said source and angularly disposed to reflect light from the source light path along a path of polarized light at an angle to said source light path to illuminate said object on said supporting means, a pair of prisms having said polarized layer mounted at said angle therebetween, one of said prisms having blackened surfaces inclined at an angle to each other and disposed in the path of light from said source and on the side of said layer remote from said source, a reflector composed of a plate provided on its back face with a plurality of triple mirrors arranged with their apices in a single plane which extends at right angles to the optical axis of the microscope, said reflector being disposed behind said object to reflect light passing through said supporting means and to depolarize said reflected light, the light reflected from said object and said reflector having substantially the same path as its incoming polarized light, and being reflected back to said polarizer which functions as an analyzer for reflecting a portion of light having one vibrational direction and for passing another portion of light therethrough having a vibration component substantially at right angles to said one direction, and rotatable optical means arranged between said polarizing layer and said object for varying the plane of vibration of the light passing therethrough.

7. In an illuminating system particularly for an object to be viewed by a microscope, a light source, a transparent supporting means for said object, a polarizing means arranged in the path of light emanating from said source for directing polarized light to said object, a reflector disposed behind said object to reflect and depolarize light passing through said transparent supporting means, said reflector comprising a plate having on its back face a plurality of triple mirrors arranged with their apices in a single plane, said reflector being positioned at right angles to the optical axis of the microscope the light reflected from said reflector and said object having substantially the same path as the polarized light directed thereon, and a rotatable optical member disposed in said plane of oscillation of the light path to control light in both directions along said path.

8. In an illuminating system particularly for an object to be viewed by a microscope, a light source, a transparent supporting means for said object, a polarizing means arranged in the path of light emanating from said source for directing polarized light to said object, a reflector disposed behind said object to reflect and depolarize light passing through said transparent supporting means, said reflector comprising a plate having on its back face a plurality of triple mirrors arranged with their apices in a single plane, said reflector being positioned at right angles to the optical axis of the microscope the light reflected from said reflector and said object having substantially the same path as the polarized light directed thereon, and a quarter wave length lamella rotatably disposed in said light path to control light in both directions along said path.

9. In an illuminating system particularly for an object to be viewed by a microscope, a light source, a transparent supporting means for said object, an angularly disposed semi-transparent reflector disposed in the path of light emanating from said source for reflecting light along a path to said object at an angle to the path of said source light, polarizing means between said light source and said semitransparent reflector composed of a plate provided on its back face with a plurality of triple mirrors arranged with their apices in a single plane which extends at right angles to the optical axis of the microscope, said reflector being a reflector disposed behind said object on said supporting means, a rotatably mounted analyzer mounted in the path of light reflected from said object and said reflector behind said object and rotatable between a position in which the polarization axis thereof is parallel to that of said polarizer and a position in which the polarization axis thereof crosses the polarization axis of said polarizer.

10. In an illuminating system particularly for an object to be viewed by a microscope, a light source, a transparent supporting means for said object, an angularly disposed semi-transparent reflector disposed in the path of light emanating from said source for reflecting light along a path to said object at an angle to the path of said source light, polarizing means between said light source and said semi-transparent reflector composed of a plate provided on its back face with a plurality of triple mirrors arranged with their apices in a single plane which extends at right angles to the optical axis of the microscope, said reflector being a reflector disposed behind said object on said supporting means, an analyzer mounted in the path of light reflected from said object and said reflector behind said object and a quarter wave length lamella rotatably disposed in said light path to control light in both directions along said path.

References Cited in the file of this patent

UNITED STATES PATENTS

| | | |
|---|---|---|
| 1,955,105 | Stimson | Aug. 17, 1934 |
| 2,192,295 | Berek | Mar. 5, 1940 |
| 2,318,705 | Morgan | Mar. 11, 1943 |
| 2,601,175 | Smith | June 17, 1952 |